D. SLATE.
TOOL-HOLDER FOR METAL-TURNING LATHES.

No. 172,664. Patented Jan. 25, 1876.

Witnesses.
Wendell R. Curtis
John T. Peters

Inventor.
Dwight Slate
by Theo. G. Ellis, Attorney

UNITED STATES PATENT OFFICE.

DWIGHT SLATE, OF HARTFORD, CONNECTICUT.

IMPROVEMENT IN TOOL-HOLDERS FOR METAL-TURNING LATHES.

Specification forming part of Letters Patent No. 172,664, dated January 25, 1876; application filed June 30, 1875.

*To all whom it may concern:*

Be it known that I, DWIGHT SLATE, of Hartford, in the county of Hartford and State of Connecticut, have invented certain new and useful Improvements in Cutting-Off Tools; and I do hereby declare that the following is a full, clear, and exact description thereof, whereby a person skilled in the art can make and use the same, reference being had to the accompanying drawings, and to the letters of reference marked thereon.

Like letters in the figures indicate the same parts.

My invention relates to that class of tools which are used in a lathe for cutting off bars by turning a deep, narrow groove therein. They have heretofore been forged out of a piece of bar-steel to the proper thin form at the cutting end, leaving the part to be inserted in the tool-holder of the lathe of a larger size, so as to give the required stiffness and strength to the tool. This extra thickness was required to approach as near as possible to the cutting-edge, so that the forging and grinding of the tool was frequent and expensive.

My invention has for its object the use of a thin plate of steel for the cutting-tool, requiring no forging, and holding this plate in a suitable block or holder, which shall render it sufficiently rigid up to the point, where it is necessarily thin for the purpose of cutting, thereby producing a tool which requires no forging or grinding, except for sharpening the cutting-edge.

Figure 1:
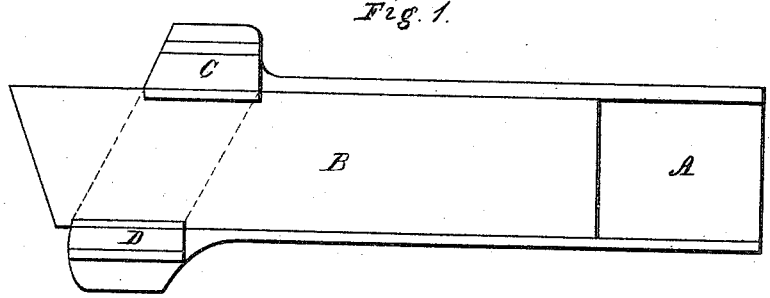
Figure 2:
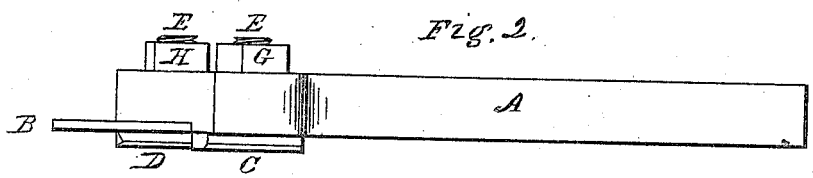
Figure 3:
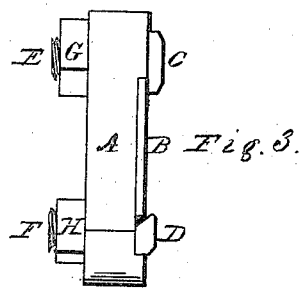

In the accompanying drawing, Figure 1 is a side view of my improved tool. Fig. 2 is a top view, and Fig. 3 is a front-end view, of the same.

A is the stock for holding the cutter B. It is made of the proper size to fit the tool-holder of the lathe, and is channeled out on one side, so as to form a recess, in which the blade or cutter B can slide longitudinally. The blade B is formed of a strip of steel of uniform cross-section, which fits into the channel in the stock A. C and D are clips, which hold the blade B firmly in its place. They are provided with screws E and F, passing through ears or projections upon the stock A, and clamping-nuts G and H, for the purpose of firmly clasping the blade to the stock when set in the proper position. The lower clamp D is set farther forward than the upper clamp C, so as to give a firm bearing for the lower edge of the blade when in use. One of the clamping-clips is made with a beveled edge to take up any lateral play there may be to the blade within the channel in the stock.

The clips C and D can be made in one band, extending across the blade, as shown by the dotted lines in Fig. 1, if desired, instead of being divided, as shown by the full lines, and before described.

What I claim as my invention is—

The combination of the channeled stock A, the blade B, of uniform section, and the clamping device C D, substantially as shown and described.

DWIGHT SLATE.

Witnesses:
 THEO. G. ELLIS,
 WENDELL R. CURTIS.